United States Patent
Chun et al.

(10) Patent No.: US 9,521,627 B2
(45) Date of Patent: *Dec. 13, 2016

(54) METHOD OF CONTROLLING TRANSMIT POWER OF UE IN WIRELESS COMMUNICATION SYSTEM AND APPARATUS FOR THE SAME

(71) Applicant: LG Electronics Inc., Seoul (KR)

(72) Inventors: Sungduck Chun, Anyang-si (KR); Sunghoon Jung, Anyang-si (KR); Seungjune Yi, Anyang-si (KR); Youngdae Lee, Anyang-si (KR); Sungjun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/528,513

(22) Filed: Oct. 30, 2014

(65) Prior Publication Data

US 2015/0055534 A1    Feb. 26, 2015

Related U.S. Application Data

(63) Continuation of application No. 13/991,585, filed as application No. PCT/KR2012/011065 on Dec. 18, 2012, now Pat. No. 9,008,025.

(Continued)

(51) Int. Cl.
*H04W 52/18* (2009.01)
*H04W 52/02* (2009.01)
*H04W 52/22* (2009.01)

(52) U.S. Cl.
CPC ......... *H04W 52/18* (2013.01); *H04W 52/0216* (2013.01); *H04W 52/221* (2013.01); *H04W 52/0245* (2013.01); *Y02B 60/50* (2013.01)

(58) Field of Classification Search
CPC ............ H04W 76/046; H04W 76/048; H04W 52/221; H04W 52/365; H04W 52/367
See application file for complete search history.

(56) References Cited

U.S. PATENT DOCUMENTS 8,527,627 B2 *  9/2013  Gerber ............... H04L 43/0876
                                                        370/229
2006/0094478 A1   5/2006  Kim et al.
(Continued)

FOREIGN PATENT DOCUMENTS

CN     101040465 A     9/2007
KR     20090003754 A   1/2009

OTHER PUBLICATIONS

Nokia Siemens Network, "UE power savings and fast dormancy in LTE network", 3GPP TSG-RAN WG2 Meeting #71bis, R2-105477, Oct. 11-15, 2010.

(Continued)

*Primary Examiner* — Xavier Szewai Wong
(74) *Attorney, Agent, or Firm* — Dentons US LLP

(57) ABSTRACT

Disclosed herein is a method of transmitting a signal at a user equipment (UE) in a wireless communication system. The method includes receiving a radio resource control (RRC) configuration message from a network; determining a preference value relating to power saving after receiving the RRC configuration message; and transmitting the determined preference value relating to the power saving to the network.

7 Claims, 9 Drawing Sheets

Related U.S. Application Data

(60) Provisional application No. 61/610,451, filed on Mar. 13, 2012, provisional application No. 61/612,401, filed on Mar. 19, 2012, provisional application No. 61/644,450, filed on May 9, 2012, provisional application No. 61/662,873, filed on Jun. 21, 2012.

(56) References Cited

U.S. PATENT DOCUMENTS

| | | | |
|---|---|---|---|
| 2008/0232310 A1* | 9/2008 | Xu | H04W 52/0216 370/329 |
| 2008/0267148 A1 | 10/2008 | Speight | |
| 2011/0130150 A1 | 6/2011 | Kolding et al. | |
| 2011/0170466 A1 | 7/2011 | Kwun | |
| 2012/0213137 A1 | 8/2012 | Jeong et al. | |
| 2013/0136042 A1* | 5/2013 | Chan | H04W 52/08 370/310 |
| 2014/0023028 A1* | 1/2014 | Zhang | H04W 52/325 370/329 |
| 2014/0056246 A1* | 2/2014 | Chun | H04W 52/0216 370/329 |

OTHER PUBLICATIONS

Research in Motion UL Limited, "UE Battery Efficiency in LTE", 3GPP TSG-RAN WG2 Meeting #71, R2-104934, Aug. 23-27, 2010.

Nokia Siemens Network, Nokia Corporation, "UE power savings and fast dormancy in LTE network", 3GPP TSG-RAN WG2 Meeting #71bis, R2-104783, Aug. 23-27, 2010.

Ericsson, ST-Ericsson: "Further details on UE assistance for power preference", 3GPP TSG-RAN WG2 #79, Tdoc R2-123763, Aug. 13-17, 2012.

3rd Generation Partnership Project; Technical Specification Group Services and System Aspects; Machine-Type and other Mobile Data Applications Communications Enhancements (Release 12), 3GPP TR 23.887 V0.4.0 (Nov. 2012), XP050650429.

\* cited by examiner (a) CONTROL-PLANE PROTOCOL STACK (b) USER-PLANE PROTOCOL STACK

METHOD OF CONTROLLING TRANSMIT POWER OF UE IN WIRELESS COMMUNICATION SYSTEM AND APPARATUS FOR THE SAME

This Application is a continuation application of U.S. patent application Ser. No. 13/991,585 filed on Jun. 4, 2013, which is a National Stage Entry of International Application No. PCT/KR2012/011065, filed Dec. 18, 2012 and claims the benefit of U.S. Provisional Application No. 61/610,451, filed Mar. 13, 2012, 61/612,401, filed Mar. 19, 2012, 61/644, 450, filed May 9, 2012, and 61/662,873, filed Jun. 21, 2012, all of which are incorporated by reference in their entirety herein.

TECHNICAL FIELD

The present invention relates to a wireless communication system, and more particularly, to a method of controlling transmit power of a user equipment (UE) in a wireless communication system and an apparatus for the same.

BACKGROUND ART

As an example of a wireless communication system to which the present invention is applicable, a 3rd Generation Partnership Project (3GPP) Long Term Evolution (LTE) communication system will be schematically described.

FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE OF INVENTION

Technical Problem

An object of the present invention devised to solve the problem lies on a method of controlling transmit power of a user equipment (UE) in a wireless communication system and an apparatus for the same.

Solution to Problem

The object of the present invention can be achieved by providing a method of transmitting a signal at a user equipment (UE) in a wireless communication system, including receiving a radio resource control (RRC) configuration message from a network; determining a preference value relating to power saving after receiving the RRC configuration message; and transmitting the determined preference value relating to the power saving to the network.

Preferably, the RRC configuration message is a RRC configuration enquiry message or a RRC reconfiguration message. Here, the RRC reconfiguration message comprising a first field that enables the UE to transmit the determined preference value relating to the power saving to the network.

More preferably, the determined preference value relating to the power saving is transmitted using a RRC reconfiguration complete message or a RRC configuration response message.

More specifically, the determined preference value relating to the power saving is included in a second field of a response message of the RRC reconfiguration message. Here, the second field may be a reason field.

Further, the UE is in a RRC connected mode.

Further, the method further comprises starting a timer upon transmitting the determined preference value relating to the power saving to the network.

Furthermore, the preference value relating to the power saving is based on an application which is being driven in the UE. More specifically, the preference value relating to the power saving is based on latency required by an application which is being driven in the UE.

As other aspect of the present invention, a method of receiving a signal at a network in a wireless communication system is disclosed. The method comprises transmitting a radio resource control (RRC) configuration message to a user equipment (UE); and receiving a preference value relating to power saving from the UE, wherein the preference value relating to the power saving is received after transmitting the RRC configuration message.

Preferably, the RRC configuration message is a RRC configuration enquiry message or a RRC reconfiguration message. Here, the RRC reconfiguration message comprising a first field that enables the UE to transmit the determined preference value relating to power saving to the network.

More preferably, the preference value relating to the power saving is received using a RRC reconfiguration complete message or a RRC configuration response message. Or, the preference value relating to the power saving is included in a second field of a response message of the RRC reconfiguration message. Here, the second field is a reason field.

More specifically, the preference value relating to the power saving is received from the UE after starting a timer by the UE. Or, the preference value relating to the power saving is based on an application which is being driven in the UE. Or, the preference value relating to the power saving is based on latency required by an application which is being driven in the UE.

Advantageous Effects of Invention

According to the embodiment of the present invention, it is possible to efficiently control uplink transmit power in various traffic states.

The effects of the present invention are not limited to the above-described effects and other effects which are not described herein will become apparent to those skilled in the art from the following description.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

Figure 1:
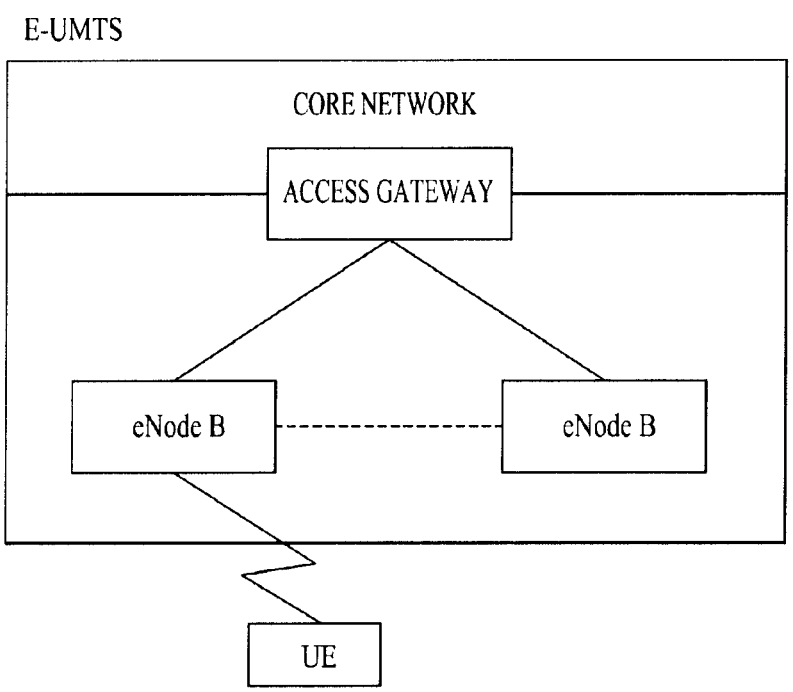
FIG. 1 is a diagram showing a network structure of an Evolved Universal Mobile Telecommunications System (E-UMTS) as an example of a wireless communication system.
Figure 2:
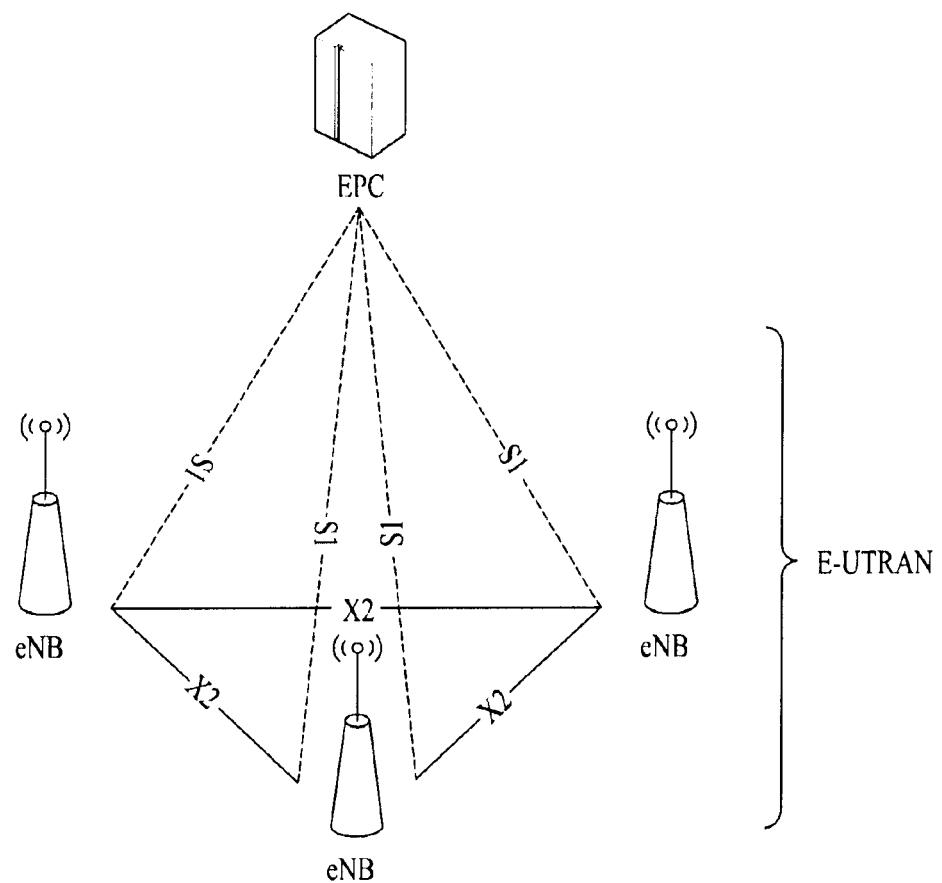
FIG. 2 is a diagram showing the concept of a network structure of an Evolved Universal Terrestrial Radio Access Network (E-UTRAN)

FIG. 2 is a diagram showing the concept of a network structure of an Evolved Universal Terrestrial Radio Access Network (E-UTRAN). In particular, the E-UTRAN system is a system evolved from the existing UTRAN system. The E-UTRAN includes cells (eNBs) and the cells are connected via an X2 interface. A cell is connected to a user equipment (UE) via an air interface and is connected to an evolved packet core (EPC) via an S1 interface.

The EPC includes a mobility management entity (MME), a serving-gateway (S-GW) and a packet data network-gateway (PDN-GW). The MME has access information of a UE and information about capabilities of the UE. Such information is mainly used for mobility management of the UE. The S-GW is a gateway having an E-UTRAN as an end point and the PDN-GW is a gateway having a PDN as an end point.

Figure 3:
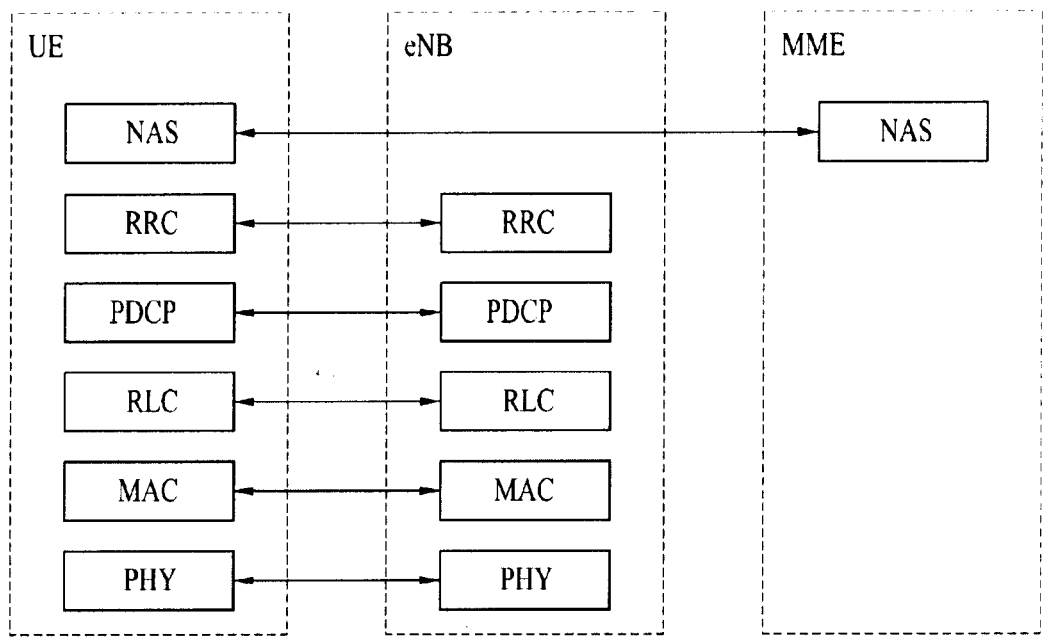
FIG. 3 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.
Figure 3:
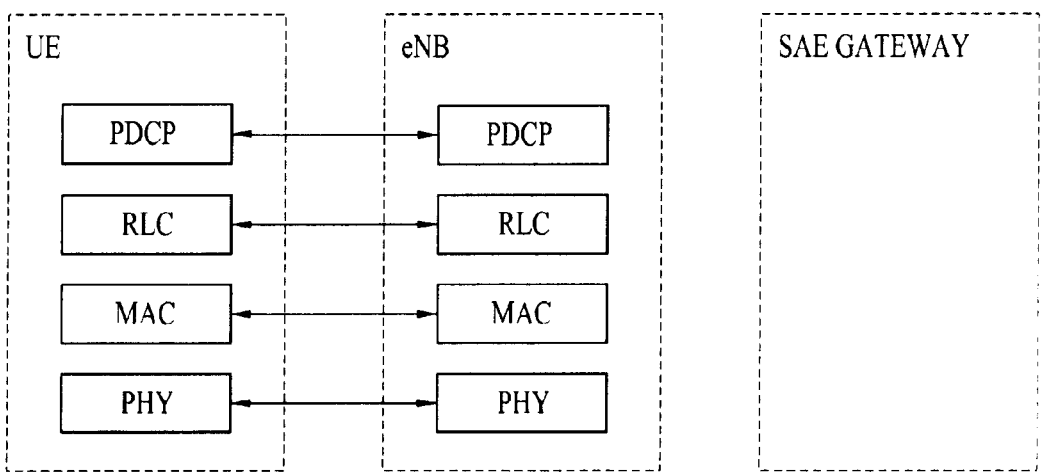

FIG. 3 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages.

One cell of the eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH).

Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 4:
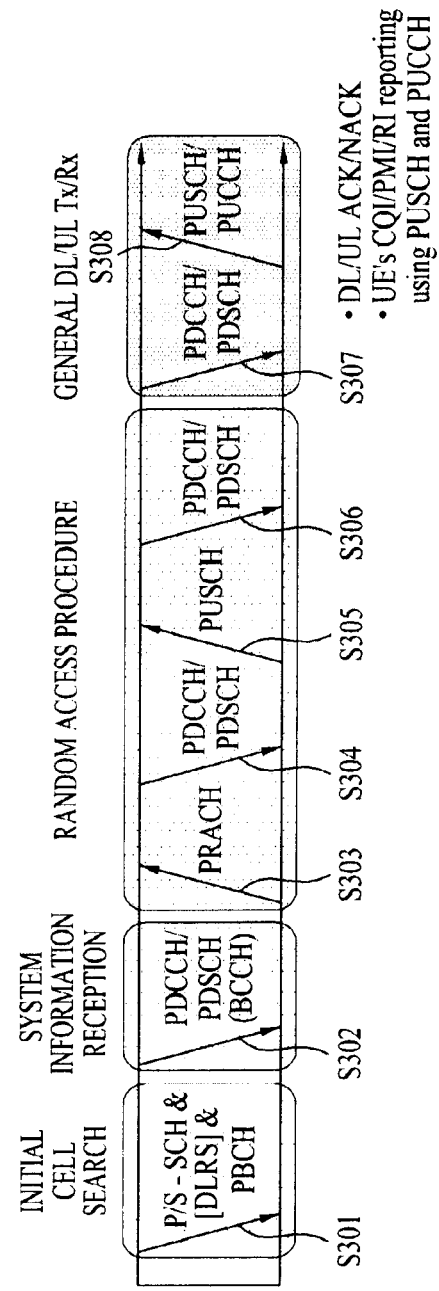
FIG. 4 is a diagram showing physical channels used in a 3GPP system and a general signal transmission method using the same.

FIG. 4 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a Channel Quality Indicator (CQI), a Preceding Matrix Index (PMI), a Rank Indicator (RI), and the like. In the case of the 3GPP LTE system, the UE may transmit the control information such as CQI/PMI/RI through the PUSCH and/or the PUCCH.

Figure 5:
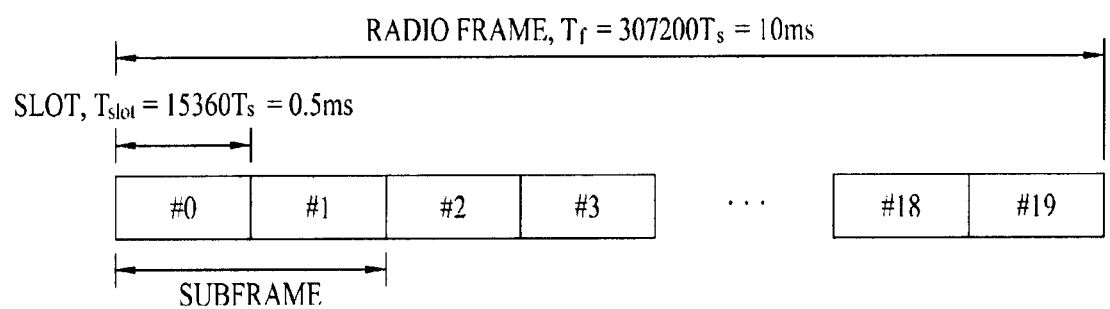
FIG. 5 is a diagram showing the structure of a radio frame used in a Long Term Evolution (LTE) system.

FIG. 5 is a diagram showing the structure of a radio frame used in a Long Term Evolution (LTE) system.

Referring to FIG. 5, the radio frame has a length of 10 ms (327200*Ts) and includes 10 subframes with the same size. Each of the subframes has a length of 1 ms and includes two slots. Each of the slots has a length of 0.5 ms (15360*Ts). Ts denotes a sampling time, and is represented by $Ts=1/(15 kHz*2048)=3.2552*10^{-8}$ (about 33 ns). Each slot includes a plurality of OFDM symbols in a time domain, and includes a plurality of resource blocks (RBs) in a frequency domain. In the LTE system, one RB includes 12 subcarriers*7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM or SC-FDMA symbols included in the slot may be variously changed.

Hereinafter, an RRC state of a UE and an RRC connection method will be described. The RRC state indicates whether the RRC layer of the UE is logically connected to the RRC layer of the E-UTRAN, is referred to as an RRC_CONNECTED state if connected, and is referred to as an RRC_IDLE state if not connected.

Since the E-UTRAN can check presence of the UE of the RRC_CONNECTED state in cell units, it is possible to efficiently control the UE. In contrast, the E-UTRAN cannot check presence of a UE of the RRC_IDLE state and a core network (CN) manages the UE of the RRC_IDLE state in a tracking area (TA) unit which is greater than a cell. That is, the RRC_IDLE state of the UE should transition to the RRC_CONNECTED state in order to receive a service, such as voice or data.

In particular, when a user initially turns a UE on, the UE first searches for an appropriate cell and camps on the cell in an RRC_IDLE state. When RRC connection needs to be established, the UE which is in the RRC_IDLE state is RRC connected to the E-UTRAN via an RRC connection procedure so as to transition to the RRC_CONNECTED state. For example, if uplink data transmission is necessary due to call connection attempt of a user or if a response message is transmitted in response to a paging message received from the E-UTRAN, the UE which is in the idle state needs to be RRC connected to the E-UTRAN.

Figure 6:
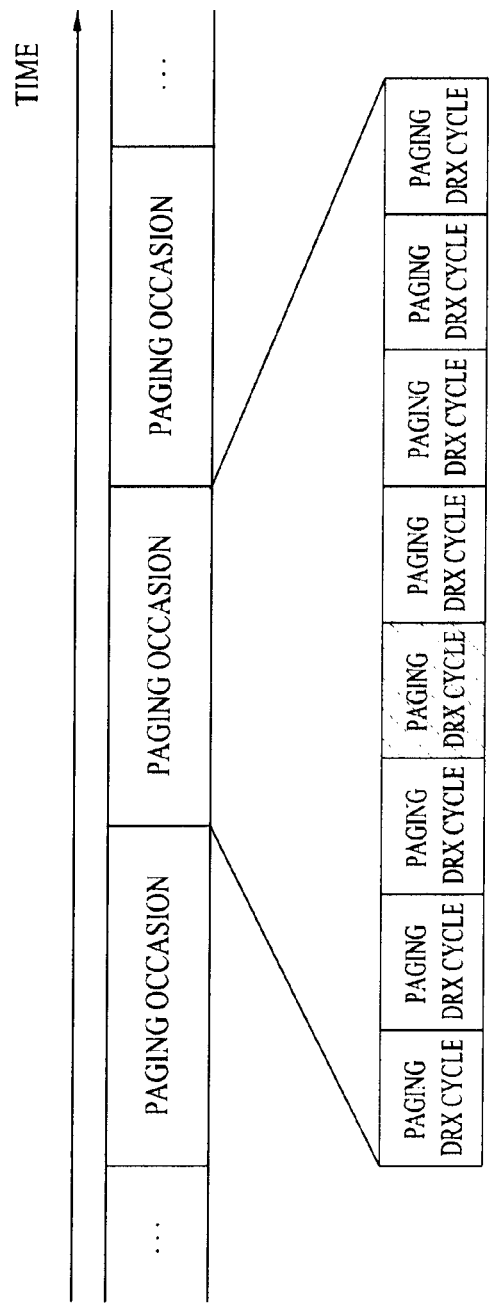
FIG. 6 is a diagram illustrating a general transmission and reception method using a paging message.

FIG. 6 is a diagram illustrating a general transmission and reception method using a paging message.

Referring to FIG. 6, the paging message includes a paging record including a paging cause and a UE identity. When the paging message is received, the UE may perform discontinuous reception (DRX) for the purpose of reducing power consumption.

More specifically, a network configures several paging occasions (POs) in every time cycle called a paging DRC cycle and a specific UE receives only a specific paging occasion and acquires a paging message. The UE does not receive a paging channel in occasions other than the specific occasion and may be in a sleep state in order to reduce power consumption. One paging occasion corresponds to one TTI.

The eNB and the UE use a paging indicator (PI) as a specific value indicating transmission of a paging message. The eNB may define a specific identity (e.g., paging-radio network temporary identity (P-RNTI) as the PI and inform the UE of paging information transmission. For example, the UE awakes in every DRX cycle and receives one subframe in order to check whether a paging message is received. If a P-RNTI is present in an L1/L2 control channel (PDCCH) of a subframe received by the UE, the UE may confirm that a paging message is present in a PDSCH of the subframe. In addition, if the identity (e.g., IMSI) of the UE is present in the paging message, the UE responds to the eNB (e.g., receives RRC connection or system information) and receives a service from the eNB.

Next, system information will be described. The system information includes essential information necessary to connect a UE to an eNB. Accordingly, the UE should receive all system information before being connected to the eNB and always have new system information. Since all UEs located in a cell should know system information, the eNB periodically transmits the system information.

The system information may be divided into a master information block (MIB), a scheduling block (SB) and a system information block (SIB). The MIB enables a UE to become aware of a physical configuration of a cell, for example, a bandwidth. The SB indicates transmission information of SIBs, for example, a transmission period. The SIB is a set of associated system information. For example, a specific SIB includes only information about peripheral cells and another SIB includes only information about an uplink radio channel used by a UE.

Hereinafter, a cell selection and cell reselection process will be described.

If a UE is powered on, the UE selects a cell having appropriate quality and performs a preparation procedure for receiving a service. A UE in an RRC_IDLE state should always select appropriate quality and prepare to receive a service from the cell. For example, a UE which is just turned on should select a cell having appropriate quality in order to perform registration with a network. If a UE in an RRC_CONNECTED state enters an RRC_IDLE state, the UE should select a cell on which the UE will camp in the RRC_IDLE state. A process of, at a UE, selecting a cell satisfying a specific condition in order to camp on the cell in a service standby state such as an RRC_IDLE state is referred to as cell selection. Since cell selection is performed in a state in which the UE does not determine a cell on which the UE camps in the RRC_IDLE state, it is important to select a cell as fast as possible. Accordingly, a cell which provides radio signal quality equal to or greater than a predetermined reference may be selected in the cell selection process of the UE, although the cell does not provide the best radio signal quality to the UE.

If a UE selects a cell satisfying a cell selection reference, the UE receives information necessary for operation of the UE in an RRC_IDLE state in the cell from system information of the cell. The UE receives all information necessary for operation of the RRC_IDLE state and then requests a service from a network or a waits reception of a service from the network in the RRC_IDLE state.

After a UE selects a certain cell in a cell selection process, the strength or quality of a signal between the UE and an eNB may be changed due to mobility of the UE or wireless environment change. Accordingly, if the quality of the selected cell deteriorates, the UE may select another cell which provides better quality. If the cell is reselected, a cell which provides better signal quality than that of a currently selected cell is generally selected. Such a process is referred to as cell reselection. The cell reselection process is performed in order to select a cell which provides the best quality to the UE from the viewpoint of the quality of the radio signal. In addition to the quality of the radio signal, the network may set priority per frequency and inform the UE of the priority. The UE which receives the priority preferentially takes the priority into consideration, rather than radio signal quality.

Next, a random access (RA) procedure provided in an LTE system will be described. The RA procedure provided in the LTE system is divided into a contention based random access procedure and a non-contention based random access procedure. The contention based random access procedure or the non-contention based random access procedure is determined depending on whether a random access preamble used in the RA procedure is directly selected by a UE or is selected by an eNB.

In the non-contention based random access procedure, the UE uses a random access preamble which is directly allocated thereto by the eNB. Accordingly, if the eNB allocates the specific random access preamble only to the UE, the random access preamble is used only by the UE and other UEs do not use the random access preamble. Accordingly, since the random access preamble corresponds one-to-one to the UE which uses the random access preamble, no contention occurs. In this case, since the eNB may become aware of the UE which transmits the random access preamble as soon as the eNB receives the random access preamble, efficiency is good.

In the contention based random access procedure, since a random access preamble is arbitrarily selected from among random access preambles which may be used by the UE and is transmitted, a plurality of UEs may always use the same random access preamble. Accordingly, when the eNB receives a specific random access preamble, the eNB may not check which UE transmits the random access preamble.

The UE performs the random access procedure 1) if a UE performs initial access without RRC connection with an eNB, 2) if a UE first accesses a target cell in a handover process, 3) if a random access procedure is requested by a command of an eNB, 4) if uplink data is generated in a state in which uplink time synchronization is not performed or radio resources to be used to request radio resources are not allocated and 5) upon a restoring process due to radio link failure or handover failure.

Figure 7:
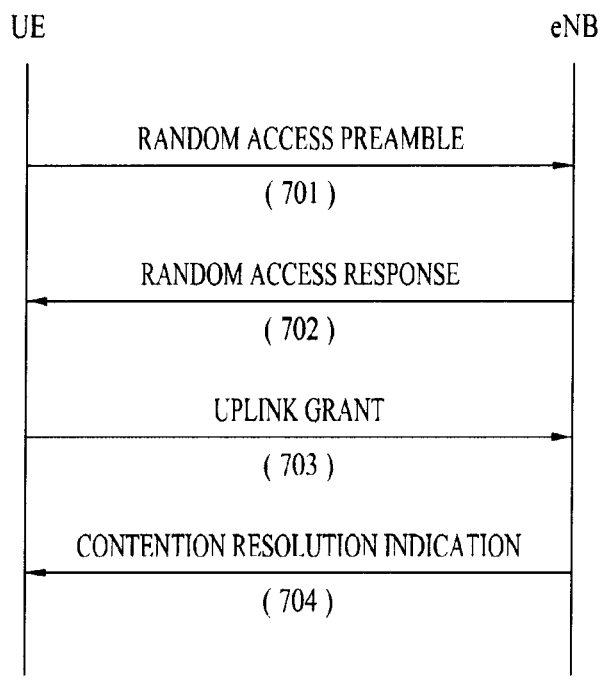
FIG. 7 is a diagram showing operations of a UE and an eNB in a contention based random access procedure provided in an LTE system.

FIG. 7 is a diagram showing operations of a UE and an eNB in a contention based random access procedure provided in an LTE system.

Referring to FIG. 7, in step 701, the UE may randomly select a single random access preamble from a set of random access preambles indicated through system information or a handover command, and select and transmit Physical Random Access Channel (PRACH) resources capable of transmitting the random access preamble. At this time, the preamble is called RACH MSG 1.

In step 702, the UE attempts to receive its own random access response within a random access response reception window indicated by the eNB through the system information or the handover command, after the random access preamble is transmitted. More specifically, RACH MSG 2, that is, random access response information is transmitted in the form of a MAC PDU and the MAC PDU is sent via a PDSCH. In addition, a PDCCH is also sent in order to enable the UE to appropriately receive the information sent via the PDSCH. That is, the PDCCH includes information about the UE which should receive the PDSCH, frequency and time information of radio resources of the PDSCH and the transmission format of the PDCCH. If the UE has successfully received the PDCCH, the random access response transmitted via the PDSCH is appropriately received according to the information about the PDCCH. The random access response includes a random access preamble identity, UL grant, a temporary C-RNTI, a time alignment command, etc. The reason why the random access preamble identity is necessary is because random access response information for one or more UEs may be included in one random access response and thus it is necessary to indicate for which UE the uplink grant, the temporary C-RNTI and the time alignment command are valid. The random access preamble identity matches the random access preamble selected by the UE in step 701.

Subsequently, in step 703, if the UE has received the random access response valid for the UE, the UE processes all information included in the random access response. That is, the UE applies the time alignment command and stores the temporary C-RNTI. In addition, data which is stored in the buffer of the UE or newly generated data is transmitted to the eNB using the uplink grant. At this time, data transmitted via the uplink grant, that is, MAC PDU, is referred to as RACH MSG 3. The identity of the UE should necessarily be included in the data included in the uplink grant. This is because the eNB may not determine which UE performs the random access procedure in the contention based random access procedure and thus should identify the UE in order to perform contention resolution later. Here, there are two different schemes for including the UE identity. A first scheme is to transmit the UE's cell identity through UL grant if the UE has already received a valid cell identity allocated by a corresponding cell prior to the random access procedure. Conversely, the second scheme is to transmit the UE's unique identity if the UE has not received a valid cell identity prior to the random access procedure. In general, the unique identity is longer than the cell identity. If the UE has transmitted data through the UL Grant, the UE starts a contention resolution (CR) timer.

Finally, after the UE transmits the data including its own identity through the UL Grant included in the random access response, the UE awaits an indication from the eNB for contention resolution. That is, the UE attempts to receive the PDCCH in order to receive a specific message. Here, there are two schemes for receiving the PDCCH. As described above, the UE attempts to receive the PDCCH using its own cell identity if the identity transmitted via the UL Grant is a cell identity, and the UE attempts to receive the PDCCH using the temporary C-RNTI included in the random access response if the identity is its own unique identity. Thereafter, in the former scheme, if the PDCCH (that is, RACH MSG 4) has been received through its own cell identity before the contention resolution timer has expired, the UE determines that the random access procedure has been normally performed and completes the random access procedure. In the latter scheme, if the PDCCH has been received through the temporary C-RNTI before the contention resolution timer has expired, the UE checks data transferred by the PDSCH indicated by the PDCCH. If the unique identity of the UE is included in the data, the UE determines that the random access procedure has been normally performed and completes the random access procedure.

Figure 8:
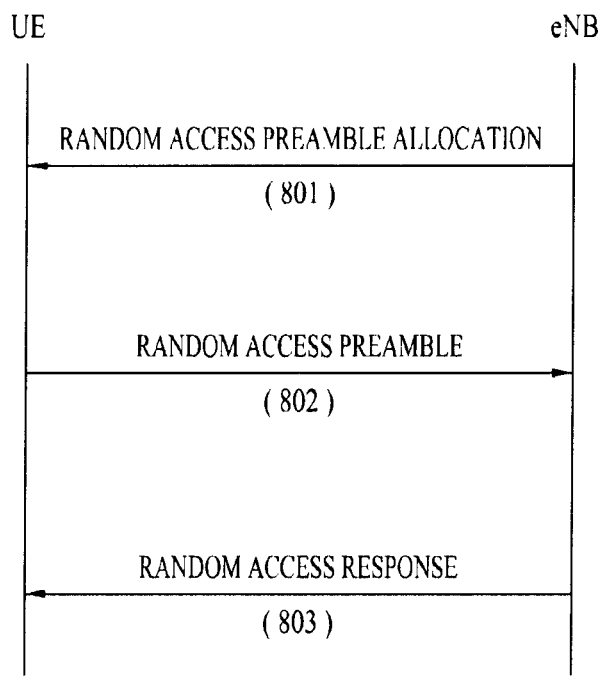
FIG. 8 is a diagram showing operations of a UE and an eNB in a non-contention based random access procedure provided in an LTE system.

FIG. 8 is a diagram showing operations of a UE and an eNB in a non-contention based random access procedure provided in an LTE system.

As described above, in the non-contention based random access procedure, unlike the contention based random access procedure, if the random access response information has been received, the UE determines that the random access procedure has been normally performed and completes the random access procedure. In addition, the non-contention random access procedure may be performed upon a handover process or when this procedure is requested by the eNB. Of course, even in these cases, the contention based random access procedure may be performed. First, for the non-contention based random access procedure, it is important to receive, from the eNB, a dedicated random access preamble which may not cause contention. In order to receive the random access preamble, a handover command and a PDCCH command may be used.

In addition, the eNB may set PRACH resources to be used when the UE transmits the random access preamble. The PRACH resources include a subframe and frequency resources to be used when the UE transmits the random access preamble.

Table 1 shows PRACH mask indices of PRACH resources which are set by the eNB with respect to the UE.

TABLE 1

| PRACH Mask Index | Allowed PRACH (FDD) | Allowed PRACH (TDD) |
|---|---|---|
| 0 | All | All |
| 1 | PRACH Resource Index 0 | PRACH Resource Index 0 |
| 2 | PRACH Resource Index 1 | PRACH Resource Index 1 |
| 3 | PRACH Resource Index 2 | PRACH Resource Index 2 |
| 4 | PRACH Resource Index 3 | PRACH Resource Index 3 |
| 5 | PRACH Resource Index 4 | PRACH Resource Index 4 |
| 6 | PRACH Resource Index 5 | PRACH Resource Index 5 |
| 7 | PRACH Resource Index 6 | Reserved |
| 8 | PRACH Resource Index 7 | Reserved |
| 9 | PRACH Resource Index 8 | Reserved |
| 10 | PRACH Resource Index 9 | Reserved |
| 11 | Every, in the time domain, even PRACH opportunity $1^{st}$ PRACH Resource Index in subframe | Every, in the time domain, even PRACH opportunity $1^{st}$ PRACH Resource Index in subframe |
| 12 | Every, in the time domain, odd PRACH opportunity $1^{st}$ PRACH Resource Index in subframe | Every, in the time domain, odd PRACH opportunity $1^{st}$ PRACH Resource Index in subframe |
| 13 | Reserved | $1^{st}$ PRACH Resource Index in subframe |
| 14 | Reserved | $2^{nd}$ PRACH Resource Index in subframe |
| 15 | Reserved | $3^{rd}$ PRACH Resource Index in subframe |

For example, in the FDD mode, the UE may transmit the random access preamble in one subframe or even subframes or odd subframes among 10 subframes according to the PRACH mask indices of Table 1.

Referring to FIG. 8, the UE receives a random access preamble allocated by the eNB in step 801 and transmits the preamble to the eNB in step 802. A method of receiving a random access response in step 803 is equal to that of the contention based random access procedure of FIG. 7.

Recently, in an Internet environment, traffic is bi-directionally generated. That is, for example, in a smart phone, a packet transmitted to a network and a packet transmitted from a network to a smart phone are present. If a smart phone, that is, a UE, generates a packet, the UE immediately accesses the network and requests that the network allocate radio resources so as to inform an eNB that the UE has data to be transmitted to the eNB. Therefore, there is no problem in packet transmission.

However, if the network generates data, the UE may not automatically recognize that the network generates the data. Accordingly, the UE determines whether there is data transmitted from the network to the UE using a signal transmitted from the network. In this case, if the UE continuously checks data to be received, a large amount of power is consumed. Accordingly, the UE checks data to be received at predetermined periods according to network configuration and this checking procedure is referred to as a discontinuous reception (DRX) procedure.

According to a DRX procedure, the network may confirm when the UE may monitor the signal of the network. At this time, the network may inform the UE that there is data to be transmitted if necessary. Here, the DRX cycle is defined and the DRX cycle sets at which time interval the UE monitors the signal of the eNB. For example, if the DRX cycle is 1 second, the UE monitors the signal of the eNB at a time interval of 1 second.

Only UEs having a simple function were present in the past. Such UEs did not have an Internet access function and provided a simple information display function although the Internet access function is present. However, as smart phones have rapidly come into widespread use, the UE may access the Internet at anytime and support new and various applications through Internet access. Each application may operate and generate traffic even when a user does not directly manipulate the UE, and, in some cases, different applications may simultaneously generate traffic. Conventionally, each UE prepared only for incoming voice call. However, in a smart phone environment, each UE should prepare for traffic which may be transmitted from the Internet to each application at anytime.

Examples of traffic mainly generated under a current smart phone environment may include traffic generated in an Internet browsing process, traffic generated in an application such as a shooting game, traffic generated in an application such as instant messaging and traffic generated in an application such as Voice over Internet Protocol (VoIP).

In case of traffic generated in an Internet browsing process, an Internet page starts to be loaded after a user clicks on a web browser, and the user starts to read content if page loading has been completed. New Internet data is not displayed until the user clicks a certain link on an Internet page. Even when a time required for loading a page after clicking is as long as several seconds, the user does not have complaints. Even in instant messaging, since it takes considerable time for a user to input text under a smart phone, instantaneous message transmission is not required.

On the contrary, in case of VoIP, voice data of a user should be immediately transmitted to a counterpart and a network and voice data of a counterpart should be immediately transmitted to a user. For reference, in case of a voice call application, voice data is generated one by one at intervals of 20 ms.

In consideration of traffic characteristics, a DRX cycle of Internet browsing or instant messaging is preferably long. However, a DRX cycle of VoIP is preferably short. Here, when the eNB sets the DRX cycle of the UE, the eNB does not know which application is installed in the UE or which application is currently being activated. In particular, since a DRX procedure is not performed with respect to data generated by the UE but is performed with respect to downlink data transmitted from the Internet to the UE, the eNB should set parameters associated with the overall DRX procedure including a DRX cycle suitable for the UE before traffic arrives from the Internet.

Even when the eNB sets DRX parameters optimized for Internet browsing with respect to the UE, if the UE actually performs VoIP, delay occurs in voice transmission and thus user satisfaction is poor. If DRX parameters optimized for VoIP are set with respect to a user who uses Internet browsing, battery charge may be rapidly drained. DRX parameters are defined in "DRX-Config" of the 3GPP standard document TS36.331 and include a DRX cycle length, a DRX cycle offset, a DRX inactivity timer, a DRX retransmission timer, etc. If the UE actually establishes connection with the eNB, the DRX configuration information is transmitted to the UE via "RadioResourceConfigDedicatedIE" of the 3GPP standard document TS36.331.

In summary, power consumption has been rapidly increased due to influence of a new traffic environment, thereby decreasing user satisfaction. Accordingly, in the present invention, in an environment in which various applications for generating data having different characteristics are installed, it is possible to reduce power consumption of a UE and increase user satisfaction by providing a data transfer service having appropriate quality.

In the present invention, a UE collects traffic environment information used to set parameters in order to manage connection between the UE and an eNB and transmits the traffic environment information to the eNB. Here, the traffic environment information may include content shown in Table 2. The traffic environment information is transmitted from the UE to the network in association with power consumption of the UE and thus may be referred to as power preference information.

TABLE 2

-Information as to whether the screen of the UE is turned on - Information as to whether there is location information of the UE- Location information
of the UE- Information as to whether an application/service of the UE generates data- Information as to whether an application/service displayed on the screen of the UE generates data- Number of applications/services which are currently activated in the UE- Information as to whether an application/service sensitive to delay is activated- Information as to whether
a GPS is turned on- Information about the velocity of the UE- Information as to whether the UE is moving or stationary- Traffic characteristic information- Power information of the UE- Information as to how much power is left in the battery of the UE- Information about power recently used for a predetermined time- Information as to whether the UE is connected to a power source- User preference information If the eNB becomes aware of the information about the velocity of the UE according to the traffic environment information of Table 2, the eNB may accurately determine whether the UE is in an RRC_CONNECTED state or an RRC_IDLE state, by taking presence of user data into consideration.

For example, a UE having a high velocity does not use a handover process but first enters an RRC_IDLE state and then transitions to an RRC_CONNECTED state in a new cell. In this case, the UE may use the following method in order to transmit velocity information to the eNB. First, the eNB sends velocity band information to the UE. For example, velocity band 1 is from 0 km/h to 30 km/h and velocity band 2 is from 30 km/h to 60 km/h. Thereafter, the UE measures the velocity thereof and informs the eNB that the velocity corresponds to velocity band 1, if the velocity of the UE corresponds to velocity band 1. Thereafter, if the velocity of the UE is changed and thus the velocity band is changed, the UE informs the eNB that the velocity is changed.

As another implementation of the velocity information, the UE informs the eNB of information indicating through how many cells the UE moves during a predetermined time when the UE transitions from the RRC_IDLE state to the RRC_CONNECTED state. For example, if the UE moves through three cells for 10 seconds, the velocity of the UE is regarded as being faster than the velocity of the UE which moves through one cell during 10 seconds. In this case, the eNB releases RRC connection of the UE having a high velocity as soon as data transfer is finished and prevent a handover operation of the UE, thereby preventing additional power consumption of the UE. Alternatively, when the UE transitions from the RRC_IDLE state to the RRC_CONNECTED state, information indicating when traffic has been finally generated in the UE and exchanged with the network may be transmitted to the eNB.

The traffic characteristic information of Table 2 is calculated in consideration of an application installed in the UE, an application activated in the UE, traffic generated in the UE, etc. The traffic characteristic information of the UE may include 1) distribution and/or average value of the sizes of traffic packets, 2) distribution and/or average value of inter-arrival time values of traffic packets, 3) TCP protocol stack information, for example, information as to whether a TCP timeout value, a TCP buffer size or a delayed ACK mechanism is used. When the traffic characteristic information is generated, the UE may take an Internet Protocol (IP) layer and operation of a lower radio protocol layer into consideration and thus may take data transmission due to an RLC status PDU such as RLC ACK into consideration.

In Table 2, user preference information refers to information indicating whether the UE requires low latency or high battery saving. For example, since latency should be minimized in case of VoIP, a short DRX cycle is required and, at this time, the UE consumes a large amount of power. On the contrary, since latency is not problematic in case of an instant messaging service, a long DRX cycle is used and thus power consumption is advantageously reduced. Accordingly, the UE informs the eNB of information as to whether a DRX cycle, in which a large amount of power is consumed but latency is short, is desired to be set through user selection or UE calculation. In other words, the UE informs the eNB of information as to whether a DRX cycle, in which a small amount of power is consumed but latency is long, is desired to be set through user selection or UE calculation. A method of sending the user preference information from the UE to the eNB may be implemented as follows.

First, the UE stores first configuration information and second configuration information with respect to DRX configuration information, selects one of the first configuration information and the second configuration information in consideration of a traffic state thereof, and informs the eNB of the selected information.

Alternatively, the UE may store only first configuration information with respect to DRX configuration information and inform the eNB whether the DRX configuration information is requested to be changed from the first configuration information in consideration of a traffic state thereof. An example of the first configuration information is first DRX configuration information transmitted by the UE. Alternatively, the first configuration information refers to configuration information associated with DRX specified by the eNB as the first configuration information when the eNB transmits DRX configuration information to the UE. Alternatively, the first configuration information refers to DRX configuration information transmitted from the eNB to the UE immediately before the eNB transmits DRX configuration information to the UE. Alternatively, the first configuration information may refer to DRX configuration information which is set and used by the UE when the eNB transmits DRX configuration information to the UE.

More specifically, if the UE does not use the first configuration information or if the UE sets the DRX cycle according to second configuration information, the UE may transmit the user preference information and request to set a DRX cycle according to the first configuration information.

Alternatively, when the UE sets the DRX cycle according to the first configuration information, the UE transmits the user preference information to the eNB and requests that the eNB set the DRX cycle according to the second configuration information, differently from the first configuration information.

The user preference information is used to inform the eNB as to whether the UE uses a long DRX cycle or whether the UE desires to transition to the RRC_IDLE state to transition to a battery saving state.

The user preference information, that is, information as to whether the UE requires low latency or high battery saving is sent from the UE to the eNB in association with power consumption and thus may be referred to as power preference indicator.

In addition, the user preference information may be transmitted to the eNB as follows. The UE transmits the user preference information to the eNB if currently set DRX configuration information is not satisfied. The user preference information transmitted at this time is relative information indicating whether the UE desires to set the DRX cycle in which power consumption is higher than the currently used DRX cycle but latency is low or whether the UE desires to set the DRX cycle in which power consumption is lower than the currently used DRX cycle but latency is high. Preferably, since only information about whether power consumption is increased or decreased or the DRX cycle is increased or decreased as compared to the currently set DRX cycle is indicated, this information may be represented using 1 bit.

However, in the above process, the traffic characteristic information may be calculated by the UE and transmitted to the network or may be directly calculated by the network. Packets transmitted from the UE to the network may be sent from the UE to a core network via a base station (eNB). Similarly, packets transmitted from the network to the UE may be transmitted via a core network and an eNB. Accordingly, if transmission latency and loss generated between the eNB and the UE is ignored, traffic transmission information calculated at the UE and traffic characteristic information calculated at each node of the network are similar. Accordingly, in another embodiment of the present invention, traffic characteristic information is calculated and specified by the network, such as PCRF/S-GW/-P-GW/eNB/MME.

In this case, while the UE is in the RRC_CONNECTED state, the network analyzes traffic exchanged with the UE, calculates traffic characteristic information, and stores the information. Preferably, when the UE transitions to the RRC_IDLE state, the traffic characteristic information generated when the UE is in the RRC_CONNECTED state is stored in the network. Thereafter, if the UE transitions to the RRC_CONNECTED state again, the stored information is sent to the eNB again and the eNB sets parameters necessary for connection to the UE using the received traffic characteristic information. In this case, the traffic characteristic information is a previously used DRX configuration or optimal DRX configuration which is stored through previous traffic analysis or setting value analysis.

In order to more efficiently set parameter values necessary for connecting the UE and the eNB, UE connection configuration information may be stored in addition to the DRX configuration value. That is, the network may store connection configuration information which has been used for recent access when the UE enters the RRC_IDLE state and establish connection with the UE using the stored information when the UE enters the RRC_CONNECTED state again.

The above-described traffic environment information and traffic characteristic information define an RRC connection configuration enquiry message, an RRC connection configuration suggestion message and an RRC connection configuration rejection message. For example, the UE receives new connection configuration information from the eNB, analyzes the connection configuration information, and informs the eNB of a parameter capable of improving capabilities or power consumption thereof via an RRC connection configuration suggestion message if present.

At this time, in order to prevent the UE from arbitrarily transmitting an RRC configuration suggestion message, the UE sends an RRC suggestion message or an RRC configuration rejection message to the network only when the network sends an RRC configuration enquiry message or information corresponding thereto. The RRC configuration rejection message informs the network that some parameters included in new connection configuration information transmitted from the network to the UE may cause problems in capabilities of the UE.

The UE may include information as to which parameter causes problems or a reference value of the parameter when sending the RRC configuration suggestion message or the RRC configuration rejection message. Additionally, when the UE transmits the RRC configuration suggestion message or the RRC configuration rejection message to the eNB, the UE may further include cause information indicating why the message is sent. The cause information field includes information indicating that power of the UE is insufficient or an application of the UE requires low latency.

As another example, when eNB wants to know UE's preferred configuration, it sends RRC Configuration Enquiry message to UE. When a UE receives a RRC Configuration Enquiry message, the UE responds with RRC Configuration Response message. If the UE wants to change RRC/PDCP/MAC/RLC/PHY configuration, the RRC Configuration Response message includes the preferred value of the parameter that the UE wants to change.

Further, a RRC Reconfiguration message can include a field RRC Suggestion field. When a UE receives a RRC message including 'RRC Suggestion field' set to 'yes', and if the UE have a parameter that it wants to change, the UE responds with preferred value for the parameter in the RRC reconfiguration complete or the RRC Configuration Response message. In this case, if the reason to change is to save power, the UE further include the reason field in the response message.

Furthermore, when the RRC message including the preferred value for the parameter such as the Power indicator is transmitted, the UE runs a timer X. Alternatively, this timer can be started when the acknowledge of successful transmission is received in the lower layer. Alternatively, this timer can be started when the new DRX setting is received from the network. While this timer is running, the UE should not transmit another RRC message including the preferred value for the parameter such as the Power indicator Power Indicator. Preferably, if the setting of Power indicator change or UE preference change while the timer X is running, the UE sends another power indicator and timer X is restarted.

In addition, the traffic environment information and the traffic characteristic information may be transmitted using a MAC control element in order to reduce overhead of the RRC message. In this case, the MAC control element may use a specific logical channel identification (LCID) value. Such MAC control element may include DRX configuration information preference of the UE.

In addition, even when the UE transmits the above-described traffic environment information and traffic characteristic information to the eNB, a specific eNB may not perform a function for processing the traffic environment information and traffic characteristic information. In this case, if the UE transmits the traffic environment information and traffic characteristic information to the eNB, this leads to radio resource waste and eNB malfunction.

Accordingly, in the present invention, the eNB informs the UE whether the eNB may perform a function associated with the traffic environment information and traffic characteristic information. The UE may inform the eNB as to whether the UE may perform a function associated with the traffic environment information and traffic characteristic information. In addition, if the eNB informs the UE as to whether the eNB may perform a function associated with the traffic environment information and traffic characteristic information, the UE may inform the eNB as to whether the UE may perform a function associated with the traffic environment information and traffic characteristic information.

If the eNB uses the traffic environment information or traffic characteristic information according to the present invention, the eNB provides appropriate connection configuration information to the UE of the user so as to use an appropriate DRX cycle or release RRC connection to the UE at an appropriate time to switch the UE to the RRC_IDLE state. Accordingly, it is possible to optimize power consumption of the UE and appropriately control latency. According to the present invention, when a mobile communication system efficiently sets a system configuration value, the UE efficiently measures and reports support information so as to reduce power consumption of the UE and to provide appropriate service quality to the user.

Figure 9:
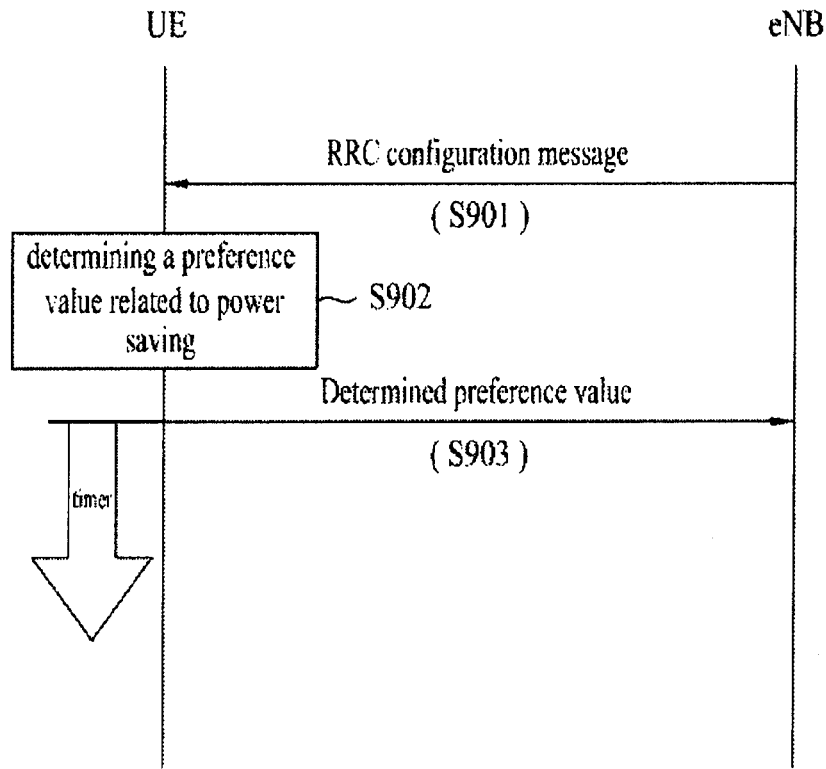
FIG. 9 is a diagram showing signal flows according to an embodiment of the present invention.

FIG. 9 is a diagram showing signal flows according to an embodiment of the present invention.

Referring to FIG. 9, the UE receives the RRC configuration message from the network such as eNB in S901. Here, the RRC configuration message can be a RRC configuration enquiry message or a RRC reconfiguration message. Preferably, the RRC reconfiguration message comprises a field that enables the UE to transmit a preference value relating to power saving to the network.

The UE, which receives the RRC configuration message, determines the preference value relating to the power saving in S902. That is, the UE determines the preference value relating to the power saving after receiving the RRC configuration message from the network.

Preferably, the preference value relating to the power saving is determined in consideration of an application which is being driven in the UE. More specifically, the preference value relating to the power saving is determined according to latency required by the application.

Further, the UE transmits the preference value relating to the power saving to the network in S903. Here, the preference value relating to the power saving is transmitted using a RRC reconfiguration complete message or a RRC configuration response message. Preferably, the preference value relating to the power saving is included in a reason field of the RRC reconfiguration complete message or of the RRC configuration response message.

More preferably, the UE can start a timer starting a timer upon transmitting the determined preference value relating to the power saving to the network. While this timer is running, the UE should not transmit another RRC message including the preference value relating to the power saving.

Figure 10:
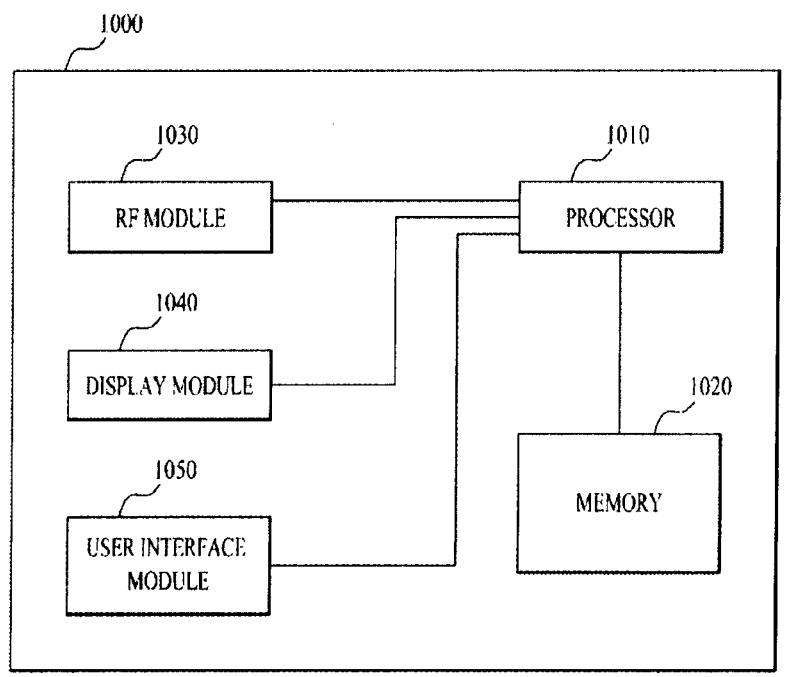
FIG. 10 is a block diagram of a communication apparatus according to an embodiment of the present invention.

FIG. 10 is a block diagram of a communication apparatus according to an embodiment of the present invention.

Referring to FIG. 10, a communication apparatus 1000 includes a processor 1010, a memory 1020, a Radio Frequency (RF) module 1030, a display module 1040 and a user interface module 1050.

The communication apparatus 1000 is shown for convenience of description and some modules thereof may be omitted. In addition, the communication apparatus 1000 may further include necessary modules. In addition, some modules of the communication apparatus 1000 may be subdivided. The processor 1010 is configured to perform an operation of the embodiment of the present invention described with respect to the drawings. For a detailed description of the operation of the processor 1010, reference may be made to the description associated with FIGS. 1 to 9.

The memory 1020 is connected to the processor 1010 so as to store an operating system, an application, program code, data and the like. The RF module 1030 is connected to the processor 1010 so as to perform a function for converting a baseband signal into a radio signal or converting a radio signal into a baseband signal. The RF module 1030 performs analog conversion, amplification, filtering and frequency upconversion or inverse processes thereof. The display module 1040 is connected to the processor 1010 so as to display a variety of information. As the display module 1040, although not limited thereto, a well-known device such as a Liquid Crystal Display (LCD), a Light Emitting Diode (LED), or an Organic Light Emitting Diode (OLED) may be used. The user interface module 1050 is connected to the processor 1010 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example of applying a method of controlling transmit power of a user equipment (UE) in a wireless communication system and an apparatus for the same to a 3GPP LTE system is described, the present invention is applicable to various wireless communication systems in addition to the 3GPP LTE system.

The invention claimed is:

1. A method of transmitting a signal at a user equipment (UE) in a wireless communication system, the method comprising:
    receiving a radio resource control (RRC) configuration message from a network, wherein the RRC configuration message comprises a first field that enables the UE to transmit to the network a preference value relating to power saving;
    determining a first preference value relating to power saving after receiving the RRC configuration message; and
    transmitting the determined first preference value relating to power saving to the network when the determined first preference value relating to power saving is different from a second preference value relating to power saving which was last transmitted to the network.

2. The method of claim 1, wherein the RRC configuration message is a RRC configuration enquiry message or a RRC reconfiguration message.

3. The method of claim 1, wherein the determined first preference value relating to the power saving is transmitted using a RRC reconfiguration complete message or a RRC configuration response message.

4. The method of claim 2, wherein the determined first preference value relating to the power saving is included in a second field of a response message of the RRC reconfiguration message.

5. The method of claim 4, wherein the second field is a reason field.

6. The method of claim 1, wherein the UE is in a RRC connected mode.

7. The method of claim 1, wherein the first preference value relating to the power saving is based on an application which is being driven in the UE.

* * * * *